United States Patent [19]

Roberts et al.

[11] Patent Number: 5,522,732
[45] Date of Patent: Jun. 4, 1996

[54] REVERSIBLE TEST BOOKLET AND ANSWER SHEET

[75] Inventors: Marilyn K. Roberts, Denver; Trudy M. Eret, Thornton, both of Colo.

[73] Assignee: School Dist. #1 in the City and Co. of Denver, CO, Denver, Colo.

[21] Appl. No.: 337,973

[22] Filed: Nov. 14, 1994

[51] Int. Cl.⁶ .................................................. G09B 3/00
[52] U.S. Cl. ..................... 434/363; 434/322; 281/15.1; 283/63.1
[58] Field of Search ................... 434/322, 353, 434/348, 349, 354, 355, 356, 358, 359, 363; 462/17, 21, 55, 70; 281/15.1, 16, 17; 283/63.1

[56] References Cited

U.S. PATENT DOCUMENTS

| | | |
|---|---|---|
| 1,500,777 | 7/1924 | Stevenson . |
| 2,310,725 | 2/1943 | Widder et al. ............... 281/15.1 |
| 2,357,082 | 8/1944 | Carolin . |
| 3,266,049 | 8/1966 | Parmenter . |
| 3,351,950 | 11/1967 | Wolfe ......................... 346/104 |
| 3,426,447 | 2/1969 | Montgomery ............... 434/348 |
| 3,634,953 | 1/1972 | Shannon . |
| 4,405,157 | 9/1983 | Bennett ........................ 283/58 |
| 4,428,733 | 1/1984 | Kumar-Misir ............... 434/363 |
| 4,815,766 | 3/1989 | Buchanan .................... 281/26 |

Primary Examiner—John G. Weiss
Assistant Examiner—Jeffrey A. Smith
Attorney, Agent, or Firm—John E. Reilly

[57] ABSTRACT

A test booklet is disclosed which is made from a plurality of overlaid sheets, each having a width less than an underlying sheet. The sheets are bifolded together along a central fold to form pairs of equal width question pages nested together with the outer page having the greatest width and each sequential inner page overlapping an underlying page by an equal width edge portion. Each pair of pages has a plurality of questions arranged on their outer sides and a unique icon on the edge portion thereof.

An answer sheet is provided which is positionable between the innermost pair of pages. This answer sheet has a plurality of vertical columns of answer areas equal to the number of pairs of question pages arranged so as to extend generally along the edge portions of the question pages. Each column on the answer sheet corresponds in position to the edge of only one question page and has a matching icon which corresponds to and is adjacent to the unique icon on the corresponding question page.

20 Claims, 6 Drawing Sheets

I put my dog's food outside one day. Later, I went outside and found the food covered with ants. A long line of ants was marching toward the food. How did they know about the dog food?

Ants live in nests. In each ant nest there are scouting ants. Scouting ants find dead or other ants in the nest. When they find food they go back to the nest to get the other ants. Ants can't talk and they can't write. How do they tell the other ants about the food?

First, the scouting ant walks back to the nest with its body close to the ground. The smell of the ant rubs off. Other ants can smell where the scouting ant has walked. The scent trail is like a "smelling path" that the other ants can follow. When the ant gets back to the nest, it pecks the other ants. It strikes them with its antennae, legs, and head. This gives the other ants a message. Soon, all the ants get excited. They start walking in a straight line toward the food.

Ants don't talk or write like people do, but they are able to communicate in their own way.

After reading the story on the opposite page, answer the following questions.

1. The word food rhymes with which of the following?
   A. could
   B. dude
   C. wood
   D. fool 2. What is the root word of the word scouting?
   A. ting
   B. scouting
   C. scout
   D. ing 3. What is a synonym of the word scent?
   A. smell
   B. penny
   C. trail
   D.

4. What is the synonym of the word strikes?
   A. strike
   B. hits
   C. touches
   D. misses 5. How many syllables are in the word communicate?
   A. 1
   B. 2
   C. 3
   D. 4

REVERSIBLE TEST BOOKLET AND ANSWER SHEET

BACKGROUND AND FIELD OF INVENTION

This invention generally relates to written test booklets and more particularly to a reusable and reversible test booklet and machine readable answer sheet especially for use by children.

A variety of reusable test booklets have been designed in the past for administration of multiple choice type written tests. Many of these booklets include machine scorable answer sheets and include mechanical arrangements to correctly position the answer sheet and to hide subsequent questions, hide answers to other questions and, in general, assist the user in maintaining his or her focus on the question and answer choices at hand. If the answer sheet is separable from the examination booklet, it is difficult for the user to orient to the correct answer area on the answer sheet. Therefore a slot, post and hole arrangement or other mechanical means is provided to fix the answer sheet in position.

For example, expired Pat. No. 1,500,777 to Stevenson discloses a series of pages of different widths in a booklet which contain questions with the answers being placed on a blank sheet of paper inserted into an open envelope shaped cover to the side. The answers to the series of questions on each page may be placed on the blank sheet adjacent the questions.

U.S. Pat. No. 3,634,953 to Shannon discloses a reusable test booklet and test scoring card having response columns formed on both sides of the card which are aligned with different test item pages. The card is inserted into a fixed, slotted pocket in a front page of the booklet. As each test item page is turned over in sequence, it will cover the answer area for the test item on the previous test item page. The card is removed after the test has been completed and machine scored.

U.S. Pat. No. 4,428,733 to Kumar-Misir discloses a medical information booklet binder in which questions are arranged on removable pages of descending width and an answer sheet placed underneath. The answer sheet has columns of answer choices in alignment with an outer margin of each page of questions. The answer sheet is removably held in place by placing the answer page's predrilled holes onto posts in the booklet binder.

U.S. Pat. No. 4,815,766 to Buchanan discloses a reusable examination booklet having a series of questions on successive pages of descending width and an answer sheet placed in a slot formed by folded over upper and lower edges of the back cover of the booklet. The answer sheet has answer areas in columns arranged to extend along the outer margins of the pages so that one column of the answer areas is in close proximity to the corresponding questions on only one question page. The answer sheet is also machine readable.

U.S. Pat. Nos. 2,357,082; 3,266,049; 3,351,950; and 4,405,157 are further examples of conventional test booklet and answer sheet designs. All of these test booklet designs include mechanisms in the booklet to align the answer sheet to the questions. However, if the answer sheet is separate from the booklet, the user must stop and think, after reading each question, where to correctly place an answer on the separate answer sheet. This takes time and leads to mistakes. There is thus a need for providing some means for indicating quickly to the user the location of the correct answer column as well as a need for some means for indicating proper alignment between the answer sheet columns and the test question pages to minimize the time needed to locate the appropriate answer area on the answer sheet.

The prior art booklet designs are relatively complex in manufacture, requiring the use of heavy cardboard, extra folds, binder posts etc. to mechanically retain the answer sheet or card in position. Therefore, there is also a need for an improved design which is simpler to manufacture and therefore inherently less expensive.

In addition, the conventional designs generally can provide only one set of questions in the booklet. There is therefore a need for an improved test booklet and answer sheet combination that provides a simple trigger or key to the user that the answer sheet is properly aligned with the question page and a need for an improved test booklet that readily accommodates a second set of test questions and answers.

SUMMARY OF THE INVENTION

The present invention is an improved test booklet and answer sheet which solves the aforementioned needs. The present invention is a reversible test booklet and corresponding answer sheet made from flat sheet paper stock which can be used both from the front and from the back progressing toward the middle of the booklet simply by turning the booklet over top to bottom. A different test or portion of the same test may be provided in each direction.

The answer sheet is merely inserted by the user between the center pair of pages for proper alignment without any need for mechanical positioning aids, such as, slotted holders, rings or the like. In addition, the test booklet of the invention preferably includes a unique icon on each page of the booklet which matches a corresponding icon on each column of the answer sheet to assist the user in matching the correct answer column with the correct test booklet page.

The reversible test booklet of the present invention comprises a plurality of pairs of equal width question pages nested together with an outer pair of pages having the greatest width and each sequential inner pair of pages being of lesser width. Each pair of question pages differs in page width from an underlying pair of pages by an edge portion which is preferably the same width from pair to pair. Each of the edge portions of each page has a unique icon thereon such as a picture of an eye, a fly, a bug or other object.

Each pair of pages in the booklet preferably has questions on the outer sides and text material on the inner sides of the pages. The text material corresponds to the questions on the outer sides of the immediately underlying pair of pages so that the text and questions correspond on facing pages when the booklet is open. The printing of the text material on the inner side of a page and the questions printed on the outer side of a page of each pair of pages is inverted from the printing on the other pages of each pair so that when the front or back of the booklet is oriented with the pages opening from right to left, the printed matter is always upright.

The answer sheet preferably has the same size as the one of the outer pair of pages. The user slips the answer sheet between the innermost or center pair of question pages. The answer sheet contains a plurality of columns of answer areas on front and back sides thereof aligned side by side along the right hand edge of the answer sheet. Each column corresponds in horizontal position to be adjacent to the edge portion of one question page. This column has an icon corresponding to and arranged so as to be adjacent to the unique icon on its corresponding question page. This arrangement assists the user to immediately ascertain that the answer sheet is so positioned with the correct column adjacent the correct question page.

As the booklet is opened, one column of answers is sequentially exposed as each question page is sequentially exposed progressing from either the front or back of the booklet to the innermost pair of pages. For example, When the answer sheet is fully inserted between the center pair of pages, the left most icon on the answer sheet will be adjacent the icon on the outer side of the center question page.

The above and other objects of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 4 is a plan view of the front part of the booklet shown in FIG. 1 opened to the first inner page;

FIG. 6 is a plan view of the front part of the booklet shown in FIG. 1 opened to the third inner page;

DETAILED DESCRIPTION OF PREFERRED EMBODIMENT

Figures 1, 2:
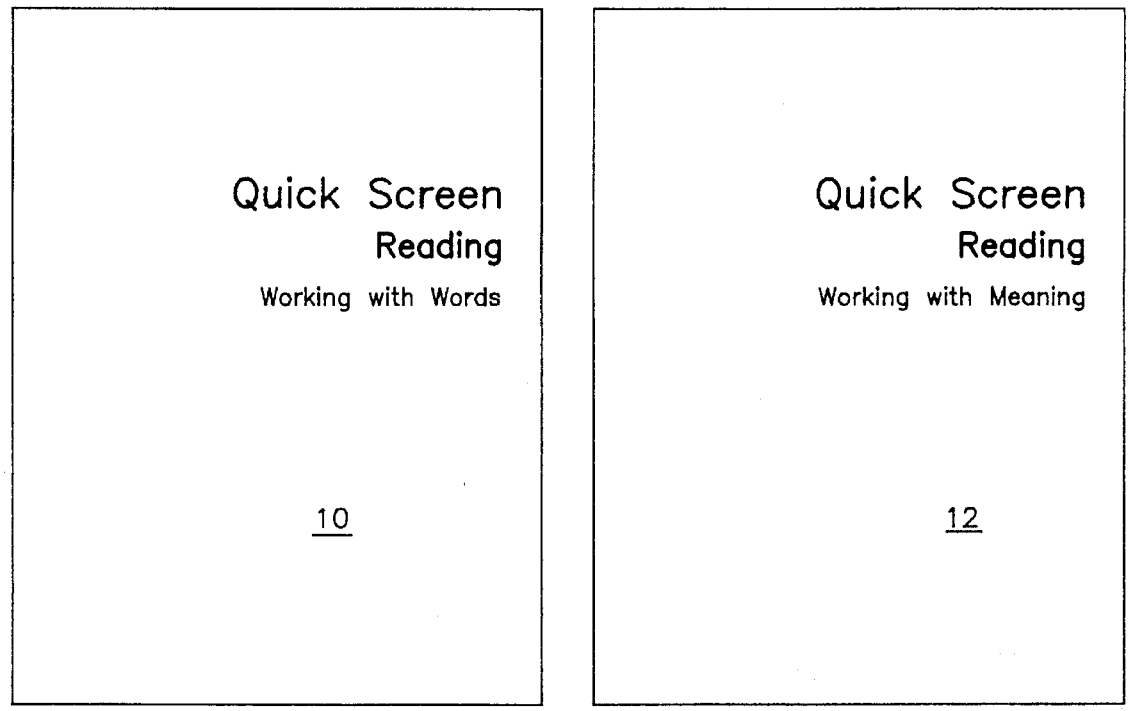
FIG. 1 is a plan view of the front cover of the Test Booklet in accordance with a preferred embodiment of the present invention.
FIG. 2 is a plan view of the back of the booklet shown in FIG. 1 turned over top to bottom.
Figure 3:
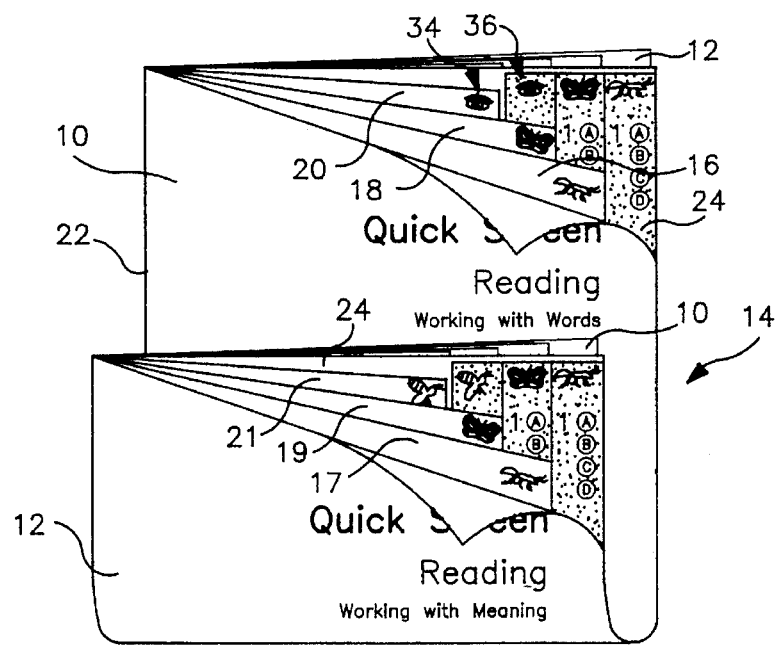
FIG. 3 is a perspective view of the booklet shown in FIGS. 1 and 2 with the answer sheet in place and the front and back pages peeled back to reveal the arrangement of inner pages.

Referring now to the drawings, the front and back outer cover pages 10 and 12 of the closed booklet 14 of the invention are shown in plan views in FIGS. 1 and 2 respectively. These cover pages are preferably made from a single bifolded sheet of paper. However, the printing shown on the back 12 is inverted from that shown in FIG. 1 so that the printing on the outer pages 10 and 12 is upright when the booklet is turned over from top to bottom as is illustrated in FIG. 3. The booklet 14 is thus a reversible test booklet which includes a plurality of inner pairs of pages 16 and 17, 18 and 19, and 20 and 21 Each pair is preferably made of flat sheet stock bifolded in the middle and nested together as is shown in FIG. 3. In this preferred embodiment the nested pages are stapled together along the central fold 22. Alternatively, the pairs of pages may be separate and bound together by side staples along the left edge or by other conventional means.

Figure 9:
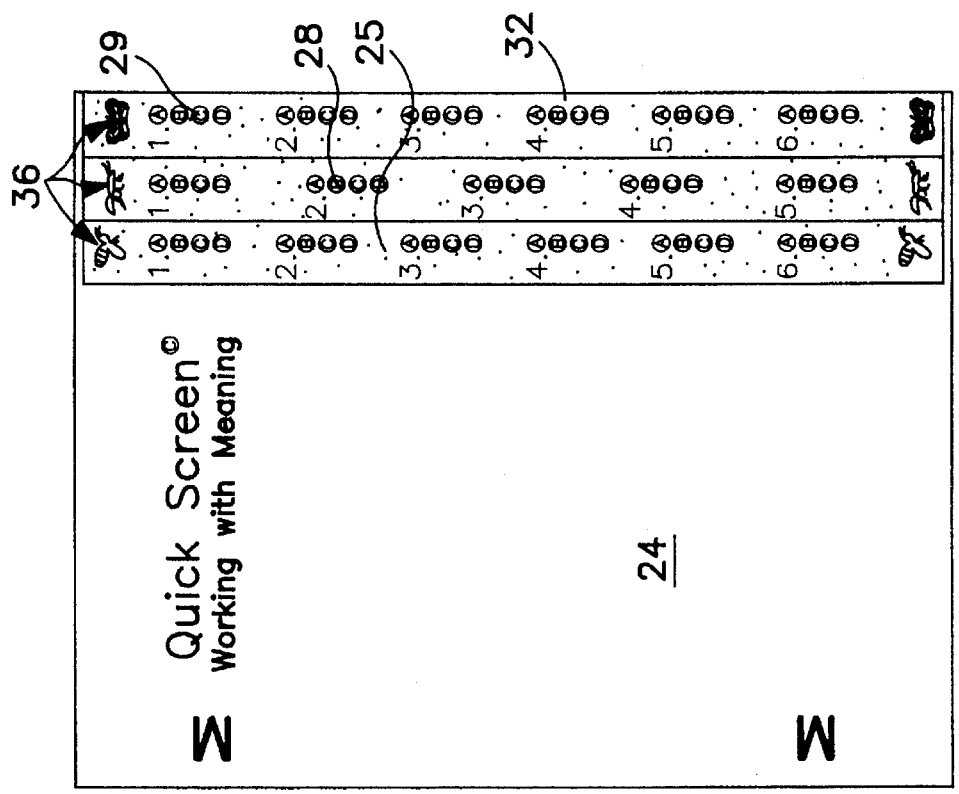
FIG. 9 is a plan view of the back side of the answer sheet shown in FIG. 8 turned over top to bottom.
Figure 8:
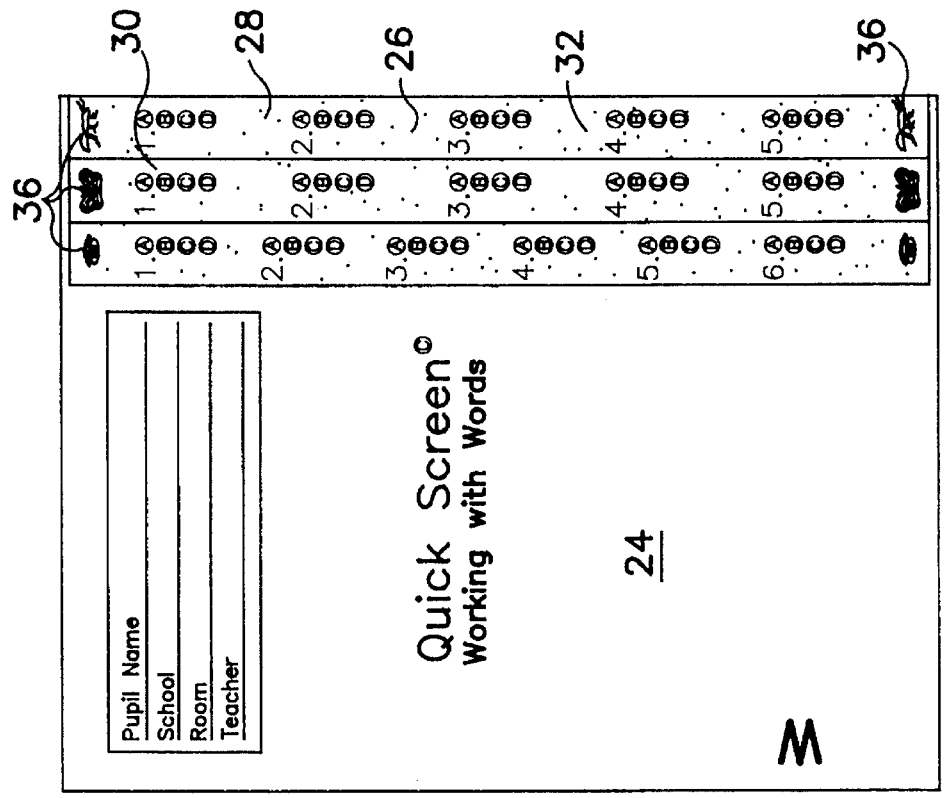
FIG. 8 is a plan view of the front side of the answer sheet in accordance with the invention inserted into the booklet shown in FIG. 3.

An answer sheet 24, shown in front and back views in FIGS. 8 and 9, respectively, is preferably the same size as the cover pages 10 and 12. The answer sheet 24 is designed to be positioned between the center or innermost pair of pages 20 and 21 as is shown in FIG. 3. The answer sheet 24 in this embodiment has three answer columns 26, 28, and 30 on the front side and three columns 25, 27, and 29 on the back side arranged vertically in side-by-side relation along one edge 32 of the answer sheet 24. In addition, the printing on the front and back sides is inverted so that it will be upright when inverted as shown in FIG. 3. The answer sheet columns contains machine scorable answer blocks or circles of conventional design.

Each pair of the question pages 16 through 21 has a width less than the immediately overlying pair of pages so that each overlying pair of question pages overlaps the immediately underlying page pair by an edge portion preferably of the same width from page to page. This overlap preferably corresponds to the width of each answer column on the answer sheet 24 so that each overlying question page covers the answer columns for the underlying pages so that only one column of answer areas page of questions is opened.

Each question page 16 through 21 also has a unique icon 34 preferably in the upper and lower corners of the edge portion on the outer side of each page. Each of the columns on the answer sheet 24 also has an icon 36 preferably above and below the answer areas in the column which is different from all of the other icons on either side of the answer sheet and which matches only the one icon on the question page adjacent to the answer column when the answer sheet 24 is fully inserted into the booklet 14. This ensures that the questions and answer areas are correctly aligned.

Figure 5:
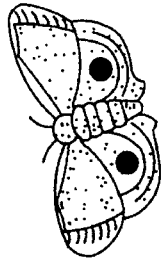
FIG. 5 is a plan view of the front part of the booklet shown in FIG. 1 opened to the second inner page.
Figure 6:
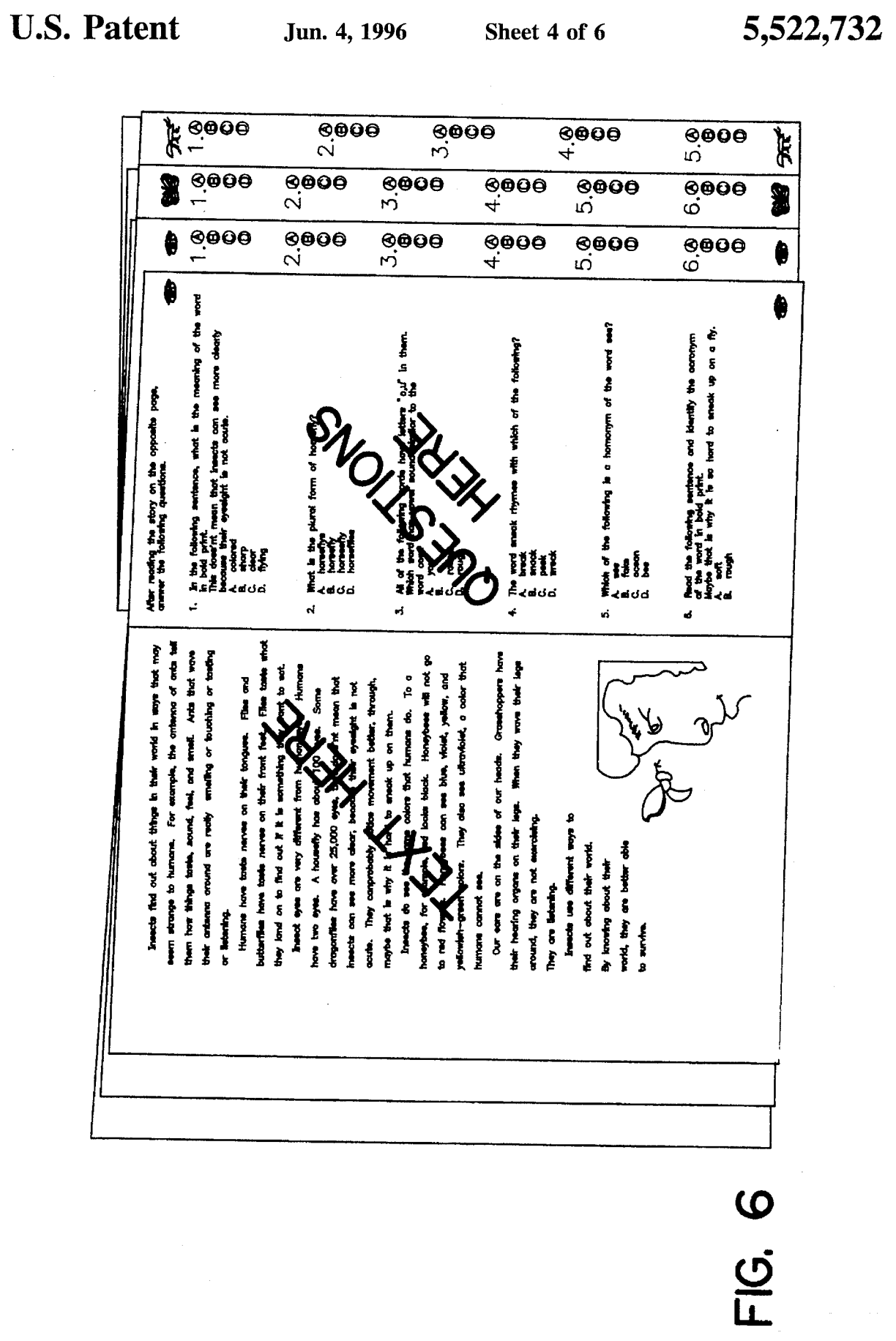

The icon 34 on each question page is preferably symbolic of the subject matter being discussed and questioned on that particular page. The inner sides of the pages 16 through 21 contain printed text material from which the questions on the facing pages are taken. For examples in FIG. 4 the inner side of the cover page 10 discusses and pictures ants. The questions on the facing, outer side, of inner page 16 contains questions on the ant story. Therefore the icon 34 used on page 16 is a black ant. Similarly in FIG. 5, the story on the inner side of the inner page 16 discusses and pictures moths and the questions on the facing page, the outer side of the inner page 18, are directed to the moth story and so a shaded moth icon 34 is used. Likewise, as shown in FIG. 6, the story and questions on the inside of page 18 and the outside of page 20 respectively relate to eyes and sight. Therefore the icon is an eye. These visual question uniquely help the user to maintain the answer sheet in proper alignment with the proper page and question without the need for a mechanical retaining device or other means for restricting answer sheet movement.

Figure 7:
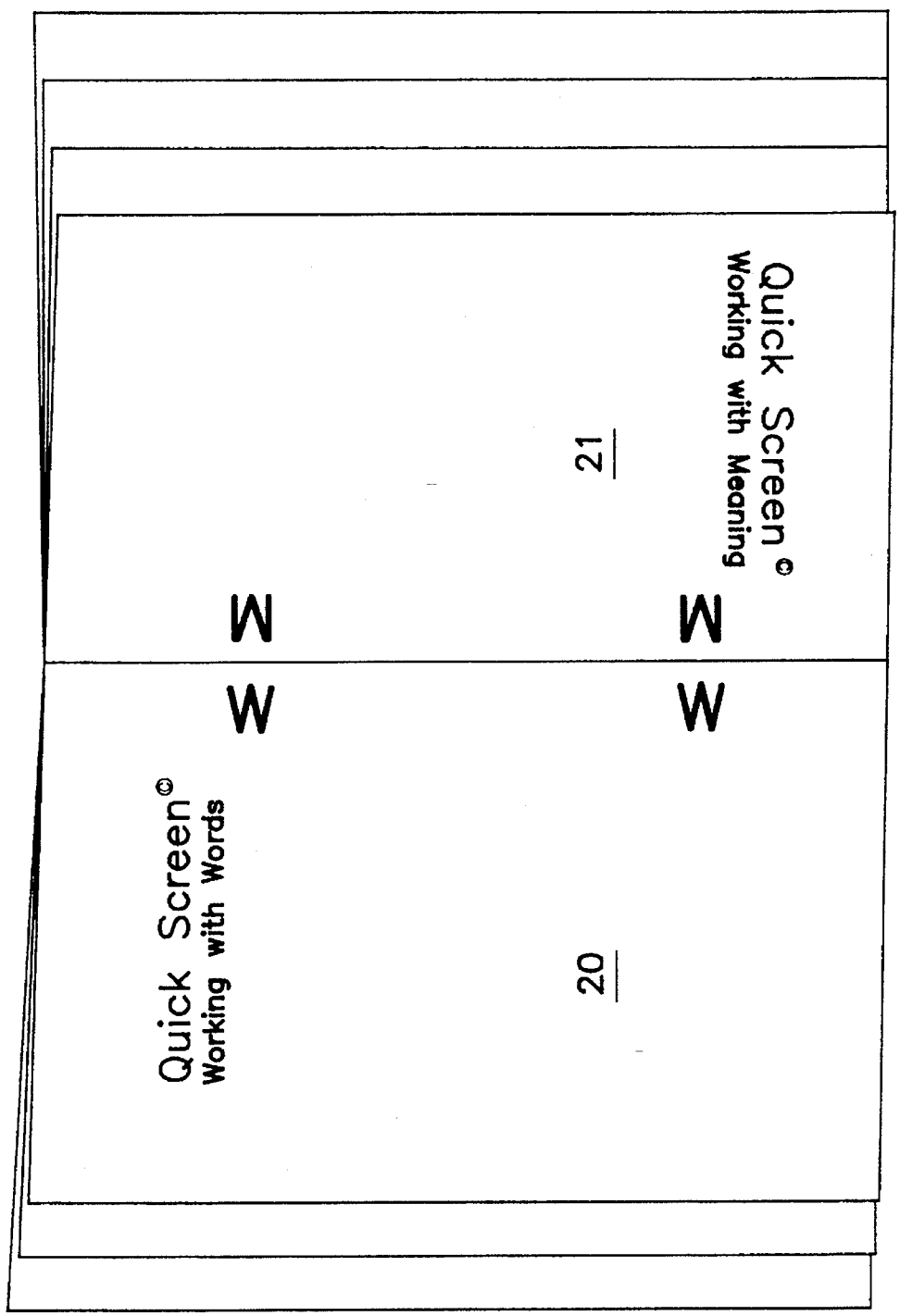
FIG. 7 is a plan view of the booklet opened to the middle or innermost page.

The inner sides of the center pair of pages 20 and 21 are shown in FIG. 7. These pages provide additional alignment marks "W" and "M" which are matched by the user with corresponding letters on the front and back sides of the answer sheet 24 as shown in FIGS. 8 and 9 to ensure proper insertion into the booklet 14. As previously noted, the printing on the front pages 10, 16, 18, and 20 is inverted from that on the back pages 12, 17, 19, and 21 so that it will be upright and visible upon turning the booklet over top to bottom. This permits two separate tests to be incorporated into one booklet. This arrangement facilitates simple timing control of booklet usage. The user can easily be instructed when to turn the booklet over and begin the second test or set of exercises.

While the invention has been described with reference to a preferred embodiment thereof, it is to be understood that other embodiments and various modifications and alternatives may be made than as specifically described herein. For example, other icon locations may be chosen rather than the top and bottom of the edge portions. In addition, many pages may be provided rather than just the three as shown in the Figures. Accordingly, these and other changes and alternatives are deemed a part of the invention as defined by the spirit and broad scope of the following claims. All patents, patent applications, and other publications referenced herein are hereby incorporated by reference in their entirety.

I claim:

1. A reversible test booklet comprising:

a plurality of pairs of question pages nested together with an outer pair of front and back pages having a greatest width and a center pair of pages of least width, each sequential inner pair of question pages being of sequentially lesser width to said center pair of pages, each said pair of pages differing in page width from an underlying pair of pages; and an answer sheet insertable between said center pair of pages, said answer sheet having answer areas on front and back sides thereof, and means for aligning said answer sheet with respect to said pages whereby selected answer areas will be sequentially exposed adjacent to one of said pages sequentially as each question page is sequentially exposed progressing from either said front page or said back page of the booklet to said center pair of pages.

2. The booklet according to claim 1, further comprising questions on one page of each pair of question pages being inverted from the questions on the other page of said pair so that when said booklet is turned over, top to bottom, said questions on each sequential page to the center page are upright.

3. The booklet according to claim 2, wherein said answer areas are arranged in columns on both sides of said answer sheet.

4. The booklet according to claim 3, wherein an edge portion of each said page has a unique icon thereon.

5. The booklet according to claim 4, wherein at least one of said columns of answer areas on said answer sheet contains an icon matching one of said unique icons on said edge portions.

6. The booklet according to claim 5, wherein each said column on said answer sheet contains an icon corresponding to and matching with the unique icon on a corresponding question page.

7. The booklet according to claim 6, wherein said edge portions are of equal width.

8. The booklet according to claim 2, wherein each said column on said answer sheet contains an icon corresponding to and matching with the unique icon on a corresponding question page.

9. The booklet according to claim 1, wherein outer sides of each of said inner pairs of pages contain questions and inner sides of said inner pairs of pages include text material from which said questions are derived.

10. The booklet according to claim 1, further comprising a plurality of overlaid sheets bifolded together along a central fold to form said pairs of pages.

11. A test booklet made from a plurality of overlaid sheets, each having a width less than an underlying sheet, said plurality of sheets being bifolded together along a central fold to form pairs of equal width question pages nested together wherein each pair of pages differs in page width from an underlying pair of pages by an edge portion and being arranged so that the edge portions of each sequential pair of pages overlaps the edge portions of the immediately underlying pair of pages;

each of said pair of pages having a plurality of questions arranged on an outer side thereof and arranged vertically adjacent to said edge portion, said questions on one page of a pair of pages being inverted from the questions on the other page so that when said booklet is turned over, top to bottom, said questions on each page are upright and visible, and each of said edge portions of each page having a unique icon in at least one corner thereof; and an answer sheet positionable between an innermost of said pairs of pages, said answer sheet having a width at least as wide as a widest of said pairs of pages, said answer sheet having a plurality of columns of answer areas equal at least in number to the number of pairs of question pages and arranged so as to extend generally along the edge portions of the question pages when the answer sheet is fully inserted between the center pair of pages, each column on said answer sheet corresponding in position adjacent to only one question page and having an icon in said column corresponding to and arranged so as to be adjacent to said unique icon on a corresponding question page to indicate that the correct column is adjacent the correct set of questions, whereby as each question page is exposed only one column of answer areas having an icon matching the unique icon on said question page appears adjacent said edge portion of said question page.

12. The booklet according to claim 11, wherein said columns on said front side of said answer sheet are inverted from said columns on the back side and are adjacently arranged along one edge of said sheet on each side of said answer sheet.

13. The booklet according to claim 11, wherein each column and page contains two icons.

14. The booklet according to claim 11, wherein inner sides of said pairs of pages include text material from which said questions are derived.

15. The booklet according to claim 14, wherein the edge portion of each question page overlaps the answer columns for any underlying question pages.

16. A reversible test booklet made from a plurality of overlaid sheets, each having a width less than an underlying sheet, said plurality of sheets being bifolded together along a central fold to form pairs of equal width question pages nested together with the outer sheet having the greatest width and each sequential inner sheet being of lesser width, wherein each pair of pages differs in page width from an underlying pair of pages by an edge portion and being arranged so that the edge portions of each sequential pair of pages overlaps the edge portions of the immediately underlying pair of pages, at least one of said pairs of pages having a plurality of questions arranged on outer sides thereof and arranged adjacent said edge portion on each page, and each of said edge portions of each page having a unique icon thereon; and an answer sheet positionable between an innermost of said pairs of pages, said answer sheet having a width at least as wide as a largest of said pairs of pages, said answer sheet having a plurality of vertical columns of answer areas on front and back sides thereof equal at least in number to the number of pairs of pages arranged side-by-side thereon and extending generally along the edge portions of the question pages when said sheet is fully inserted between said innermost pair of pages, each column on said answer sheet corresponding in position adjacent to the edge portion of only one of said question pages and having an icon in said column corresponding to and arranged adjacent to said unique icon on said one of said question pages, whereby as each question page is exposed, only one column of answer areas having an icon matching the unique icon on said question page appears adjacent said edge portion of said question page.

17. The booklet according to claim 16, wherein said columns on said front side of said answer sheet are inverted from said columns on the back side and are adjacently arranged along one edge of said sheet on each side of said answer sheet.

18. The booklet according to claim 16, wherein each column and page contains two icons.

19. The booklet according to claim 16, wherein inner sides of said pairs of pages include text material from which said questions are derived.

20. The booklet according to claim 19, wherein the edge portion of each question page overlaps the answer columns for any underlying question pages.

\* \* \* \* \*